United States Patent [19]

Jasko et al.

[11] Patent Number: 4,465,703

[45] Date of Patent: Aug. 14, 1984

[54] HARD BUTTER AND PROCESS FOR MAKING SAME

[75] Inventors: James J. Jasko; Susan M. Domek, both of Middleburg Heights, Ohio

[73] Assignee: SCM Corporation, New York, N.Y.

[21] Appl. No.: 399,715

[22] Filed: Jul. 22, 1982

Related U.S. Application Data

[63] Continuation-in-part of Ser. No. 289,362, Jul. 31, 1981, abandoned.

[51] Int. Cl.³ ............................................. A23D 5/00
[52] U.S. Cl. .................................... 426/607; 426/613
[58] Field of Search ............................... 426/607, 613

[56] References Cited

U.S. PATENT DOCUMENTS

| | | | |
|---|---|---|---|
| 2,975,060 | 3/1961 | Best et al. ......................... | 426/607 |
| 3,093,480 | 6/1963 | Arnold ............................. | 426/607 X |
| 4,157,405 | 6/1979 | Yasuda et al. ..................... | 426/607 |
| 4,199,611 | 4/1980 | Toyoshima et al. ................ | 426/607 |
| 4,219,584 | 8/1980 | Mori et al. ....................... | 426/607 |
| 4,268,527 | 5/1981 | Matsuo et al. ..................... | 426/607 X |

FOREIGN PATENT DOCUMENTS 129348 3/1972 India .
827172 2/1960 United Kingdom .

*Primary Examiner*—Robert A. Yoncoskie
*Attorney, Agent, or Firm*—Richard H. Thomas

[57] ABSTRACT

A cocoa butter hard butter equivalent comprising a blend of (a) the solid fraction which is obtained from fractionation of crude or refined sal fat, and (b) a solid palm mid-fraction obtained from two-step fractionation of palm oil removing a liquid fraction in a first fractionation step and then a solid filter cake fraction in a second fractionation step.

5 Claims, 5 Drawing Figures

SOLVENT FRACTIONATION OF SAL FAT

SOLVENT FRACTIONATION OF PALM OIL

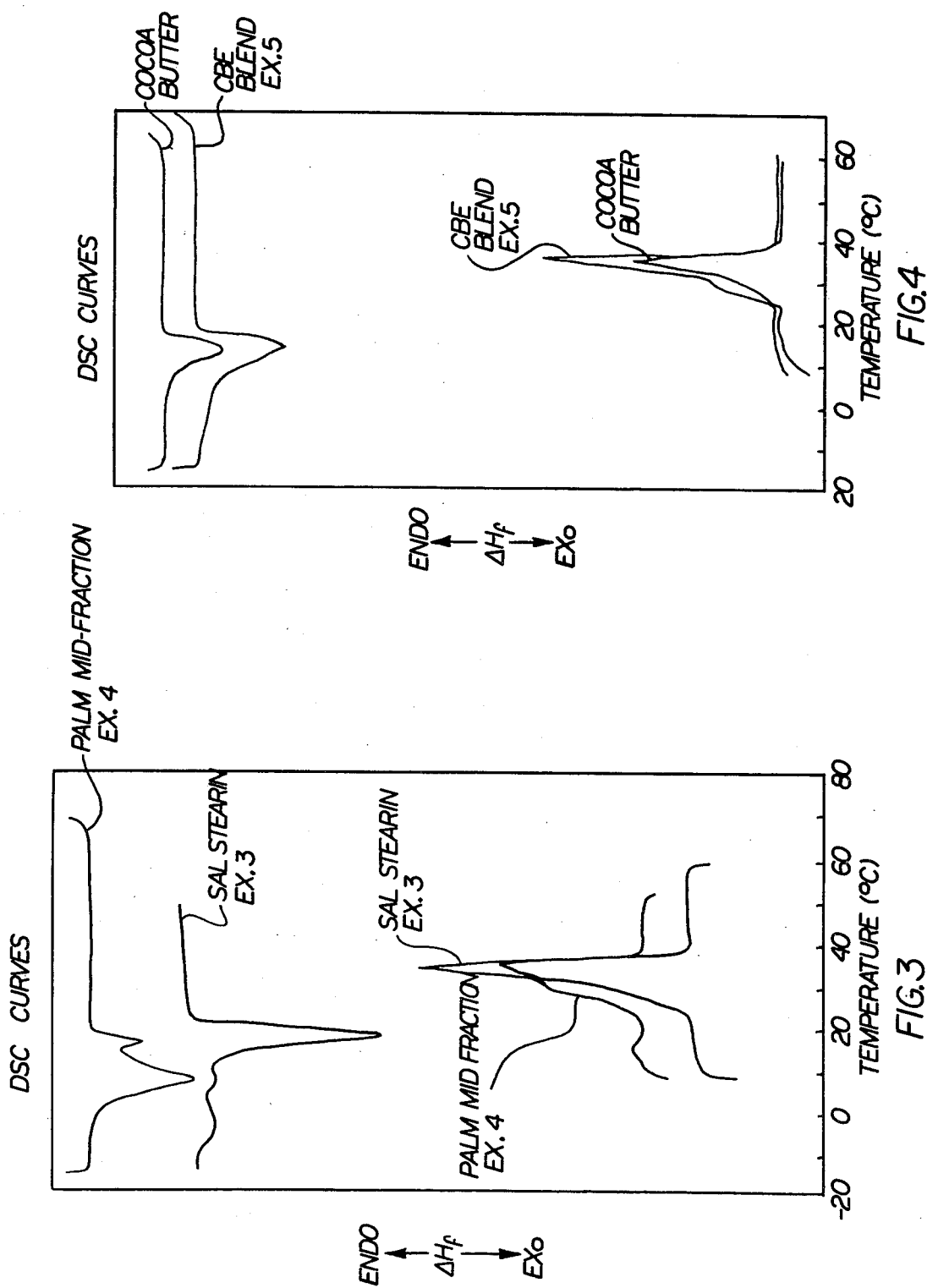

HARD BUTTER AND PROCESS FOR MAKING SAME

This invention is a continuation-in-part of prior application Ser. No. 289,362, filed July 31, 1981, now abandoned, and assigned to assignees of the present application.

The present invention relates to cocoa butter equivalents, methods of producing such equivalents, and products containing the same.

BACKGROUND OF THE PRESENT INVENTION

Cocoa butter is an important ingredient of chocolate, but is frequently in relatively short supply. There have been many attempts to find a substitute or equivalent hard butter composition which can be blended with cocoa butter or used in place of cocoa butter.

The present invention particularly relates to an improved cocoa butter equivalent comprising a blend of refined, fractionated sal fat and a mid-fraction of palm oil.

Cocoa butter possesses a unique triglyceride structure which is not found in other fats. It consists of three major triglyceride groups, namely, POP, SOS, and POS, where P equals the palmitic acid, S equals the stearic acid, and O equals the oleic acid radicals positioned in 1-2-3 order on the esterified glycerine residue. These three triglycerides comprise nearly 80% of all the available glycerides in cocoa butter. Also, these particular triglycerides and their unique symmetrical saturated-unsaturated-saturated fatty acid arrangement contribute to cocoa butter's melting and solidification properties. Cocoa butter rapidly melts at body temperature, yet is remarkably hard at ambient conditions. It is for this reason that confectionery coatings containing fats other than cocoa butter often tend to exhibit poor functional quality while allowing for some cost savings. These cocoa butter substitute fats, called hard butters, are generally designed to replace specific portions of added cocoa butter in confectionery coatings. They, therefore, must have compatibility with various levels of cocoa butter if the desired quality is to be obtained. Generally, the more similar the hard butter is in triglyceride structure to cocoa butter, the more it can replace cocoa butter in confectionery applications without detrimental effects.

U.S. Pat. No. 2,975,060 (believed to be the equivalent of British Pat. No. 827,172) describes a cocoa butter equivalent comprising palm oil fraction rich in POP triglycerides, blended with Illipe Butter (*Shorea stenoptera*) as a source of SOS and POS triglycerides. When combined, these two component fats exhibit similar physico-chemical characteristics to cocoa butter, and as a result, compatibility with cocoa butter is said to be achieved at a broad range of admixture levels. The product of this patent is marketed by Unilever Ltd. under the trademark "Coberine". The Illipe Butter component, however, is not readily available on the market, making it necessary for manufacturers to search for other components for hard butter equivalents.

The fractionation of palm oil to yield POP-rich mid-fractions is well documented and is in practice by several palm oil manufacturers. For instance, the above mentioned U.S. Pat. No. 2,975,060 describes such fractional crystallization. However, it is generally felt that this material by itself is not useful as a cocoa butter equivalent.

In the U.S. Pat. No. 2,975,060 patent, one fractionation procedure disclosed involves obtaining a filter cake product from an acetone solvent solution of refined, deodorized palm oil of IV 53.4, at about 6.5° C., and then obtaining from such filter cake a filtrate of IV 33.6 by a second fractionation at about 26° C. The only data given in the patent on the product are dilatation values at several temperatures, plus yield and IV (Iodine Value).

In Indian Pat. No. 129,348, accepted Mar. 23, 1972, there is described a method for the preparation of a cocoa butter substitute comprising a blend of a mid-fraction of palm oil with a fraction of sal fat, the latter being described as the residual left from removal of a lower-melting fraction (about 20-30%). Little data is given on the palm mid-fraction, except for broad ranges of IV and dilatation values at several temperatures. It is indicated in the patent that a purpose of the development thereof was to produce a product suitable for hot climates, and for this purpose the sal fat fraction is described as being harder than cocoa butter at all temperatures up to the melting temperature (about 39° C.) of cocoa butter.

U.S. Pat. No. 4,157,405 also discloses preparing a blend of refined sal fat with a refined palm oil for the purpose of producing a cocoa butter equivalent, but said sal fat is not fractionated. Further, the palm oil component is described as refined, having an IV of 47 to 54, suggesting the absence of fractionation of this component as well.

For purposes of the present application, a cocoa butter "equivalent" hard butter is one which is compatible (bloom-resistant) with cocoa butter in confectionery applications at a level up to about 60 weight parts of such "equivalent" per about 40 weight parts of cocoa butter, a so-called "total replacement"; or, in some instances, the "equivalent" can take the place entirely of cocoa butter. Even at such levels, the cocoa butter "equivalent", blended with cocoa butter or by itself, must be capable of being tempered by well known procedures for tempering cocoa butter into its most stable polymorphic form, thereby resisting bloom formation.

Despite the desire in the past to closely simulate, in hard butter, the triglyceride structure of cocoa butter, it has been impossible to do more than arrive at an approximation of such structure with greater or lesser detrimental effect, depending upon the source of fats used.

Part of the reason for this is that the triglyceride groups POP, SOS, and POS, as mentioned, make up nearly 80% of the available glycerides, but the remaining 20%, a mixture of glycerides, very significantly affects the properties of the cocoa butter. It is not known what effect each of the several such glycerides have on the properties of cocoa butter, other than collectively.

Attempts have been made to synthesize the POP, SOS and POS groups and blend them in the desired ratio, but without the ability to duplicate the remaining 20% such attempts have resulted in failure.

In addition, by the use of blends of natural fats, it has never been possible to exactly duplicate the POP, SOS, POS ratios of cocoa butter. For instance, in the case of "Coberine", described in U.S. Pat. No. 2,975,060, the POS content is 15-16% compared with nearly 40% of this group in cocoa butter.

The result is that it is totally empirical and adventitious to arrive at a hard butter blend of fats which is an excellent equivalent for cocoa butter. The present invention represents just such a fortuitous and adventitious discovery of such equivalent fat.

BRIEF DESCRIPTION OF THE PRESENT INVENTION

The present invention resides in a novel hard butter equivalent comprising a blend of (a) a fractionated crude or refined sal fat having an IV of about 29-36 and a Mettler Dropping Point of about 36°-39° C. (taken on a tempered sample) and consisting essentially of triglycerides of fatty acids in the following approximate proportions:

| Fatty Acid | Approximate Percentages |
|---|---|
| Palmitic | 5-8 |
| Stearic | 45-52 |
| Oleic | 30-40 |
| Linoleic | less than 1.5 |
| Arachidic | 4-10 | with at least about 89% of the oleic acid equivalents being in the 2-position of the triglycerides; and (b) a mid-fraction of palm oil having an IV of about 30-44 and a Mettler Dropping Point of about 33°-38° C. and consisting essentially of triglycerides of fatty acids in the following approximate proportions:

| Fatty Acid | Approximate Percentages |
|---|---|
| Palmitic | 51-58 |
| Stearic | 5-8 |
| Oleic | 30-36 | with at least about 71% of the oleic acid equivalent being in the 2-position of the triglycerides.

The present invention also resides in a novel cocoa butter equivalent hard butter having an approximate fatty acid composition consisting essentially of:

| Fatty Acid | Approximate Percentages |
|---|---|
| Palmitic | 31-43 |
| Stearic | 18-30 |
| Oleic | 33-35 | at least about 80% of the oleic acid being in the 2-position of the triglycerides, said hard butter having an IV of about 33-35 and a triglyceride compositon as determined by High Performance Liquid Chromatography and Gas Chromatography* of about:

| POP triglyceride | 27-44 |
| POS triglyceride | 11-15 |
| SOS triglyceride | 14-28 | where P equals palmitic acid, S equals stearic acid, and O equals oleic acid. The total symmetrical triglycerides, as determined by argentation thin-layer chromatography, should be at a minimum of 65%, preferably more than 75%. A reasonable upper limit for total symmetrical triglycerides is about 90%.

*The HPLC/GC weight percent data reported herein may include small weight percents of un-symmetrical isomers.

BRIEF DESCRIPTION OF THE DRAWINGS

The present invention and advantages thereof will become apparent upon consideration of the following specification with reference to the accompanying drawings, in which

FIG. 3 contains Differential Scanning Calorimetry (DSC) curves of a useful palm mid-fraction and a useful sal fat fraction prepared according to the procedures of FIGS. 1 and 2;

FIG. 4 contains curves giving Differential Scanning Calorimetry (DSC) data of cocoa butter and the cocoa butter equivalent blend defined in accordance with the concepts of the present invention.

DETAILED DESCRIPTION OF THE PRESENT INVENTION

Definitions

Cooling Curve Test

Figure 1:
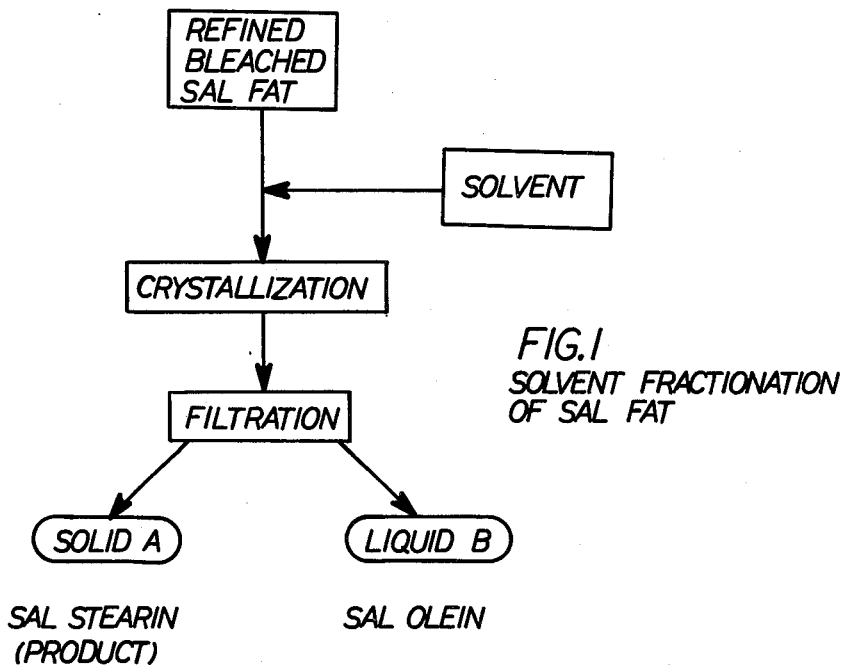
FIG. 1 is a flow diagram illustrating a process for preparation of a sal fat fraction in accordance with the concepts of the present invention.

A number of tests have been devised to determine the efficacy of cocoa butter equivalents, one being a Cooling Curve Test.

The closer the cooling curve of a cocoa butter equivalent is to the cooling curve of cocoa butter itself, the better the performance of such equivalent in the manufacture of chocolate confections.

The Cooling Curve test is based on a method described in "The Chemistry, Flavoring and Manufacture of Chocolate Confectionery and Cocoa", H. R. Jensen, P. Blakistons' Son & Co., Inc., Philadelphia, 1931. Similar methods are also described in British Pat. No. 1,390,936, and U.S. Pat. No. 4,157,405.

In essence, the test comprises placing 75.0 grams of melted, de-gassed fat in a glass test tube. The tube is sealed with a rubber stopper supporting a thermometer and stirrer. The sample is placed in a 50° C. water bath for 15 minutes and then allowed to stand at room temperature with occasional stirring until the sample cools to 34° C. At that time, the test tube is placed in an air jacket in a 17° C. water bath. The fat is cooled gradually by the water bath and the temperature is measured at one minute intervals starting at the point when the temperature reaches 32° C. With the first recorded temperature, the sample must be stirred constantly at the rate of 2 strokes every 15 seconds. As the fat cools, it crystallizes, and the latent heat of crystallization causes the temperature of the fat to rise. The readings are stopped when the temperature rise is less than 0.1° C. Therefore, the cooling curve will always have a minimum and a maximum point.

Mettler Dropping Point Test

Apparatus necessary for performing the Mettler Dropping Point determination includes the Mettler Instrument Corporation electronic control FP5 modified to heat at a fairly slow rate and Mettler furnace FP53 with accessories, and Wiley Melting Point plates. Accessories are at least one sample cup, which fits into a cartridge, which assembly in turn fits into a sleeve.

The sample cups have a bottom opening of 2.8 mm diameter. They also fit into the holes of the Wiley plate.

One packs the cup with the sample after the cup has been precooled and still remains in the Wiley plate holes, dioxide). It is not necessary to level off the top of the cup. The sample then is chilled for at least ten minutes. A starting temperature 5° C. below the expected melting point is set on the furnace control, along with a programmed heating rate of 1° C. per minute. When furnace temperature agrees with the indicator on the control unit, the chilled dropping point cup is removed from the dry ice tray by using the upper portion of the cartridge and assembled with such cartridge, then the drop-collecting sleeve is attached. This assembly is inserted vertically into the furnace and rotated until the cartridge locks in position. At this state the cup is equilibrated with the lowest temperature of the furnace by waiting two minutes, then the automatic heating rate is activated. The Dropping Point will be recorded by the apparatus, usually in °C. The Dropping Point very closely approximates the Wiley Melting Point, and it is more reproducible; it eliminates an operator's subjectivity which is inherent in measurement of Wiley Melting Point.

Solids Fat Index (SFI)

The Solids Fat Index is a measure by dilatometry of the solid phase coexisting with the liquid phase of a fat at a given temperature, and it can be measured by the AOCS Official Method Cd 10-57.

Differential Scanning Calorimetry

This is a test procedure giving thermodynamic measurements of the melting and solidification behavior of lipid materials. The analysis was performed on a Du-Pont 990 Thermal Analyzer (trademark) and followed procedures specified for this instrument.

High Performance Liquid Chromatography (HPLC)/Gas Chromatography (GC)

This is a test procedure for determining triglyceride structure data for lipid materials. In this test procedure, the HPLC analysis is used to separate the lipid material into a plurality of triglyceride fractions of specific total carbon number. Subsequent to this separation, the GC analysis is used to identify degrees of unsaturation (i.e., double bonds) on each respective triglyceride fraction. From this data, the triglyceride of the starting lipid material can be identified and their proportion of various fatty acids determined as a percentage of the total fatty acid equivalents present. Such percentage closely approximates weight percentage.

The HPLC method employs a Varian LC Model 5060 (trademark) instrument and procedure therefor. The GC method employs a Hewlett-Packard GC Model 5880A (trademark) instrument and procedure therefor.

Argentation (Silver Nitrate) Thin-Layer Chromatography (TLC)

This is a test procedure for determining the amount of symmetrical triglycerides of the S—U—S type, where S=saturated fatty acid and U=mono-unsaturated fatty acid. In this test procedure, the SUS triglyceride moiety is isolated by argentation (silver nitrate) on a thin-layer chromatographic plate. The SUS band is recovered and converted to methyl esters which are analyzed by gas chromatography. The addition of a known internal standard triglyceride MOM, where M=margaric acid and O=oleic acid, allows quantitation of the SUS content from the fatty acid composition of the recovered material. This method is commonly used within the EEC for the quantitation of the SUS content of cocoa butter equivalent lipid materials, and is specified by CAOBISCO in Europe for the utilization of CBE fats in commercial confectionery products.

Solvent Fractionation of Sal Fat

Sal fat is one of the fats generally categorized as Borneo tallow-type fats, and it is extracted from the seeds of *Shorea robusta*, a naturally occurring tree in the tropics.

The process for preparing a refined, fractionated, bleached sal fat is shown schematically in FIG. 1. The starting material may be either a crude sal fat, or a refined, bleached sal fat as indicated. In the case of the former, refining and bleaching can take place subsequent to the procedure shown in FIG. 1, if desired. In either event, that is use of a crude fat, or refining and bleaching prior to or subsequent to fractionation, the refining and bleaching steps can follow generally the procedure set forth in copending patent application Ser. No. 035,510, filed May 3, 1979, entitled "Improvement in Processing Sal Fat", assigned to assignee of the present application. The disclosure of copending application Ser. No. 035,510 is incorporated by reference herein.

In essence, the procedure involves subjecting the crude sal fat to conventional degumming, and then (prior to or after solvent fractionation) alkali refining followed by sorbent bleaching. Usually, the crude sal fat obtained from solvent extraction of sal seeds is degummed using about 0.1 to about 0.5% commercial 60-90% phosphoric acid, based on the weight of the crude sal fat. The degumming is carried out at about 35°-100° C. in the presence of water, producing a sludge precipitate of phosphatides and other gums. The crude precipitate collects at the bottom and the sal fat is decanted or centrifuged from the precipitate. Following degumming, the sal fat may then be alkali refined, using aqueous sodium hydroxide in sufficient amount to react with free fatty acids present in the fat to form a sodium soap of such acids. The soap stock is the heavier phase and is removed by centrifugation. Preferably, an 8% to about 16% aqueous solution of sodium hydroxide is prepared and added to the degummed sal fat and the mixture is subjected to vigorous agitation at about 35°-95° C. Usually, centrifugation is accompanied by repeated steps of water washing.

In the bleaching step, the sorbent bleaching is preferably carried out in the presence of about 0.1-1% of acid, at a temperature of about 100°-120° C., under a pressure of about 0.1 to about 760 mm of mercury. A preferred sorbent bleach is an acid activated clay.

In the solvent fractionation step, the crude or refined, bleached sal fat is dissolved in an organic solvent, preferably 2-nitropropane, or acetone, and cooled with agitation to a temperature that allows for the crystallization of 70-75% of the starting material. This fraction is removed as a solid residue after filtration, the "Solid A" fraction in FIG. 1. The filtrate portion contains a liquid fraction "Liquid B" which represents the remaining 25-30% of the starting material. The "Solid A" fraction filter cake is washed with a given volume of solvent, repulped and filtered into the filtrate. Both the filter cake and filtrate are subsequently solvent evaporated. The "Solid A" fraction is called sal stearin and represents the desired product fraction. The "Liquid B" fraction is called sal olein and is a byproduct material.

In the case of using as the starting material a degummed crude sal fat, the sal stearin fraction would then be further processed by alkali refining and bleaching, as above described. In either event, it is also desirable in the procedure to subject the product to steam deodorization. The final product has an IV value of about 29–36 and after tempering a Mettler Dropping Point (MDP) of about 36°–39° C., at a 1° C. per minute heating rate.

The following examples illustrate the above procedure in detail.

EXAMPLE 1

This example illustrates the solvent fractionation of sal fat in accordance with the concepts of the present invention.

Approximately 300 grams of crude sal fat (IV equals 38–42) was dissolved in acetone (dried to <0.2% water) by volume at 35° C. The solution was cooled in a scraped-wall vessel at a 1° C. min. cooling rate to at or about 6.5° C. in 57.1 minutes. The crystal slurry was filtered in a funnel under reduced pressure until the filter cake was sufficiently dewatered. Approximately 450 ml. of dry acetone was used to wash the filter cake via repulping and the slurry filtered into the original filtrate. The cake was then pressed with a rubber dam under reduced pressure to dryness.

The dry cake was solvent evaporated and the residual fat fraction represented 66.5% of the starting crude sal fat base stock. The solvent evaporated sal stearin was steam deodorized under 0.1 torr pressure at 240° C. for 45 minutes. The deodorized sal stearin was then filtered to remove any extraneous material. This sal stearin fraction (Solid A in FIG. 1) exhibited the physico-chemical properties shown in Table I below. In this example, there was no refining and bleaching of the starting material or product.

TABLE I

PHYSICO-CHEMICAL PROPERTIES OF SAMPLE

| | Fatty Acid Moieties as Percentage of those Present | | | |
|---|---|---|---|---|
| | Undeodorized Sample | | Deodorized Sample | |
| Carbon No. of Fatty Acid Content | % in whole Sample | % in 2-position* | % in Whole Sample | % in 2-position* |
| 12:0 lauric | Trace | 0.1 | — | — |
| 14:0 myristic | — | 0.1 | — | trace |
| 16:0 palmitic | 5.7 | 1.1 | 5.7 | 0.9 |
| 18:0 stearic | 51.1 | 4.1 | 51.3 | 3.3 |
| 18:1 oleic | 32.5 | 92.0 | 33.0 | 93.1 |
| 18:2 linoleic | 0.9 | 2.5 | 0.8 | 2.5 |
| 18:3 linolenic | 0.3 | — | trace | — |
| 20:0 arachidic | 9.4 | 0.1 | 9.1 | 0.2 |
| IV of sample | 30.8 | | 30.4 | |
| % Phosphatides in sample | 0.9 | | 0.9 | |
| % Free Fatty Acid in sample | 0.73 | | 0.09 | |

*Determined by pancreatic lipase hydrolysis.

EXAMPLE 2

Approximately 300 gms. of refined, bleached sal fat (IV=38–42) was dissolved in dry acetone (<0.2% water) at 35° C. The solution was crystallized and filtered according to the same conditions described in Example 1.

The dry filter cake was stripped of solvent by evaporation, and the residual fat fraction represented 70.8% of the starting refined, bleached sal fat base stock. The resulting solvent evaporated sal stearin was steam deodorized under 0.2 torr pressure at 240° C. for one hour. The deodorized sal stearin fraction was then filtered to remove any extraneous material. This sal stearin fraction (Solid A in FIG. 1) exhibited the physico-chemical characteristics shown below in Table II.

TABLE II

PHYSICO-CHEMICAL PROPERTIES OF SAMPLE
Mettler Dropping Point (MDP) - 36.8° C. (after tempering)

| Fatty Acid Carbon No. | % in Whole Sample | 2-Position* |
|---|---|---|
| 12:0 | trace | — |
| 16:0 | 5.9 | 0.9 |
| 18:0 | 51.0 | 4.2 |
| 18:1 | 32.9 | 92.0 |
| 18:2 | 0.8 | 2.2 |
| 18:3 | — | 0.2 |
| 20:0 | 9.1 | 0.5 |
| IV of sample | 29.7 | |
| % Phosphatides in sample | 0.03 | |
| % Free Fatty Acids in sample | 0.05 | |

*Determined by pancreatic lipase hydrolysis

EXAMPLE 3

Approximately 225 gms of degummed, refined sal fat (IV=38–42) was dissolved in 2-nitropropane at 95° F. (35° C.). The solution was cooled in a scraped-wall vessel to at or about 32° F. (0° C.) in 37 minutes. Crystallization began at 45° F. (7.2° C.) and once the solution reached 41° F. (5° C.) the temperature rose to 44° F. (6.7° C.) due to an intense heat of crystallization. After this rise in slurry temperature, cooling resumed until the cutting temperature was reached (32° F.). The crystal slurry was then filtered off in a Büchner funnel under reduced pressure. Approximately 450 ml. of 2-nitropropane was used to wash the filter cake via repulping and the slurry filtered into the original filtrate. The solid cake was then pressed with a rubber dam under reduced pressure to dryness.

The filter cake was solvent evaporated and the residual fat fraction (sal stearin) represented 76.7% of the starting degummed, refined, bleached sal fat base stock. The solvent evaporated sal stearin was subsequently bleached with 0.25% phosphoric acid, 0.2% activated carbon, and 2.0% Filtrol 105 (trademark, Filtrol Corp.) bleaching at 100° C. under 0.5 torr pressure for one hour. The bleached sal stearin was then steam deodorized at 240° C. under 0.5 torr pressure for one hour. The deodorized sal stearin fraction was then filtered to remove any extraneous material. This sal stearin fraction (Solid A in FIG. 1) exhibited the physico-chemical characteristics shown below in Table III.

TABLE III

PHYSICO-CHEMICAL PROPERTIES OF SAMPLE

| Fatty Acid Carbon No. | % Fatty Acid of Total Present |
|---|---|
| 14:0 | trace |
| 16:0 | 6.3 |
| 17:0 | 0.2 |
| 18:0 | 49.1 |
| 18:1 | 33.7 |
| 18:2 | 1.2 |
| 20:0 | 9.3 |
| 22:0 | 0.2 |
| IV | 31.1 |
| % unsaponifiables | 0.07 |
| % phosphatides | 0.09 |
| Polymorphic Form | (x-ray) | initial:beta - II
6 days at room temperature storage:beta - III

This sal stearin fraction exhibits DSC melting and solidification curves as shown in FIG. 3, and represents the sal stearin component of the cocoa butter equivalent blend described in Example 5. The sal stearin fraction, in the upper solidification curve, had a single sharp peak with a minimum value at about 18° C. The corresponding melting curve exhibited a single sharp peak with a maximum value at about 36° C.

Solvent Fractionation of Palm Oil

Figure 2:
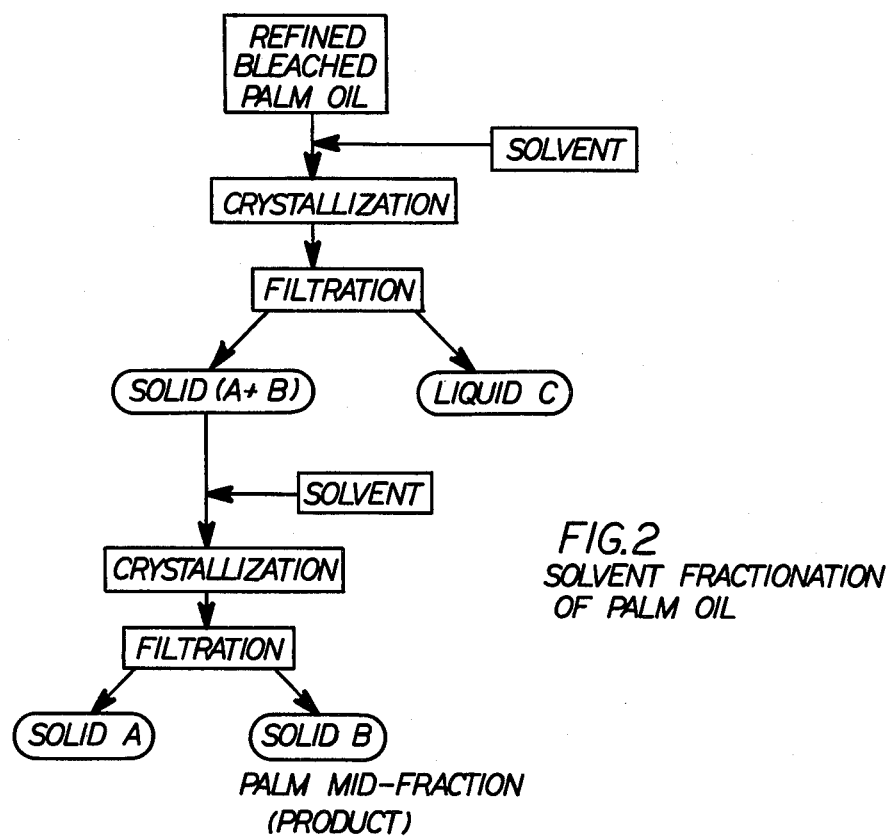
FIG. 2 is a flow diagram illustrating a process for preparation of a palm mid-fraction in accordance with the concepts of the present invention.

The fractionation of palm oil to yield a fraction rich in POP and POS type triglycerides, involves removing a highly saturated top fraction (the Solid A & B fraction in FIG. 2) by solvent fractionation, followed by crystallization of a desired mid-fraction (the Solid B fraction). The mid-fraction has an IV of about 30-40 and a Mettler Dropping Point of 33°-38° C. at a 1° C. per minute heating rate. Details of the procedure of FIG. 2 will be described in the following Example 4. The following examples illustrate the above procedures in detail.

EXAMPLE 4

Approximately 275 gms of refined, bleached palm oil with an IV of 54 were dissolved in 1842 gms of 2-nitropropane. The solution was heated to 50° C. where it was observed to be free of any solid material. The solution was then cooled in a scraped-wall vessel to at or about 23°-24° C. in 30 minutes, where initial crystallization was observed. Cooling was continued to at or about 5° C. in an additional 36 minutes, and held at that temperature for 10 minutes.

The crystal slurry was then filtered under reduced pressure until the filter cake was sufficiently dewatered. Three separate solvent washes of 550 gms each (at 4°-5° C.) were applied to the filter cake with repulping after each wash. Each wash was allowed to pass into the original filtrate after filtration under reduced pressure. The thoroughly washed filter cake was pressed with a rubber dam under reduced pressure until sufficient cake dryness was achieved. The dried filter cake was subsequently solvent evaporated. The residual lipid material represented approximately 32% of the starting palm oil, and exhibited an IV of 28. This fraction is shown as "Solid (A&B)" on FIG. 2, with the liquid filtrate fraction after solvent evaporation as "Liquid C". This residual "Liquid C" was obtained as 68.9% yield from the starting palm oil base stock.

The entire "Solid (A&B)" fraction was then dissolved in 516 gms of 2-nitropropane at 50° C. The solution was cooled in a scraped-wall vessel by being placed in a bath held at 26° C. Crystallization occurred at 32°-33° C., and the slurry reached 26° C. in about 15 minutes. The crystal slurry was held at 26° C. for 10 minutes to allow for equilibration. It was then filtered under reduced pressure in a Büchner funnel until the filter cake was sufficiently dewatered. One solvent wash of 275 gms was applied to the filter cake with repulping and additional filtration under reduced pressure into the filtrate. The cake was pressed with a rubber dam under reduced pressure. Solvent was evaporated from both the filter cake and the filtrate. The residual lipid fraction from the filter cake is shown as "Solid A" in FIG. 2, and the residual fraction from the filtrate is shown as "Solid B". The "Solid B" fraction is the desired mid-palm fraction. "Solid A" was obtained at a 6.6% yield from the starting palm oil.

The "Solid B" fraction was 24.5% of the starting refined, bleached palm oil, and exhibited a 34.4 IV. It was steam deodorized at 240° C. under 0.05 torr pressure for one hour, and filtered free of any extraneous material. The physico-chemical properties of this palm mid-fraction are given in Table IV below.

TABLE IV

| PHYSICO-CHEMICAL PROPERTIES OF SAMPLE | |
|---|---|
| SFI @ 50° F. | 76.1 |
| 70° F. | 71.3 |
| 80° F. | 54.3 |
| 92° F. | 6.4 |
| 100° F. | 0.5 |

Mettler Dropping Point, 35.2° C. (1° C./min. cooling rate)

| Fatty Acid Carbon No. | % in whole sample | % in 2-position* |
|---|---|---|
| 12:0 | 0.1 | 0.2 |
| 14:0 | 1.0 | 0.6 |
| 16:0 | 57.1 | 13.4 |
| 18:0 | 6.4 | 1.0 |
| 18:1 | 31.7 | 77.1 |
| 18:2 | 3.2 | 7.6 |
| 20:0 | 0.3 | — |

*As determined by pancreatic lipase hydrolysis.

This palm mid-fraction exhibits DSC melting and solidification curves as shown in FIG. 3, and represents the palm mid-fraction component of the cocoa butter equivalent blend described in Example 5. The palm mid-fraction in the upper solidification curve had a double peak profile with minimum values at about 16° C. and 8° C., respectively. The corresponding melting curve exhibited a somewhat broad single peak with a maximum value at about 36° C.

EXAMPLE 5

Several blends of sal stearin prepared following the procedure of Example 3 and palm mid-fraction prepared following the procedure of Example 4, were formulated. Surprisingly, a 50/50 admixture of the two components exhibited physico-chemical properties remarkably similar to cocoa butter. The following Table V illustrates the comparison.

TABLE V

PHYSICO-CHEMICAL PROPERTIES OF BLEND
Composition: 50% palm mid-fraction, 50% sal stearin
Mettler Dropping Point 35.6° C. (1° C./min. cooling rate after tempering) The MDP of representative cocoa butter likewise measured is 33.6° C.

| | Blend of present invention | | Cocoa Butter | |
|---|---|---|---|---|
| Fatty Acid Carbon No. | % in whole sample | % in 2-position* | % in whole sample | % in 2-position* |
| 14:0 myristic | 0.4 | 0.4 | 0.1 | 0.1 |
| 16:0 palmitic | 31.4 | 8.0 | 26.1 | 1.3 |
| 17:0 margaric | 0.1 | — | 0.2 | — |
| 18:0 stearic | 27.9 | 2.8 | 35.2 | 1.6 |
| 18:1 oleic | 34.4 | 82.3 | 34.0 | 88.0 |
| 18:2 linoleic | 2.2 | 5.8 | 3.0 | 8.0 |
| 20:0 arachidic | 3.7 | 0.3 | 1.0 | — |
| IV | 34.5 | | 34.7 | |
| Polymorphic Form (x-ray) | beta - II/III | | beta-III | |

*As determined by pancreatic lipase hydrolysis

A further illustration of the compositional similarities of the blend of this Example to cocoa butter is also revealed when triglyceride structure data is examined. These data are determined by two analytical methods. With High Performance Liquid Chromatography (HPLC) and Gas Chromatography (GC), a pure triglyceride portion of the sample is separated into component fractions consisting of triglyceride groups identified by total carbon number (CN) and degree of total unsaturation from all three fatty acid groups. Total symmetrical triglyceride content was quantitatively measured using argentation TLC.

Table VI below gives the triglyceride structure data for the blend of this Example and cocoa butter.

TABLE VI
TRIGLYCERIDE STRUCTURE DATA
AS DETERMINED BY HPCL/GC ANALYSIS

| Triglyceride* | % Triglyceride | |
|---|---|---|
| | Blend of Example V | Cocoa Butter |
| POP | 33 | 22 |
| POS | 14 | 34 |
| SOS | 27 | 29 |

*P = palmitic (16:0)
S = stearic (18:0)
O = oleic (18:1)

Total symmetrical triglycerides via argentation TLC were, for the blend—78; and for the cocoa butter—85.

These data show that the blend of this Example made from palm mid-fraction and sal stearin contained the same major triglycerides found in cocoa butter, but not in the same proportions. For example, the amount of POS in this sample was only 14 as compared to 34 in cocoa butter. The total amounts of the symmetrical triglycerides, as determined by argentation TLC, were close (78 vs 85).

It was found that the cocoa butter equivalent of the present invention exhibited good compatibility with cocoa butter at conventional extender levels (up to 15% basis total fat of a confectioner's coating).

Observation of the thermal behavior of the cocoa butter equivalent of the present invention in comparison with the thermal behavior of cocoa butter indicates a likelihood of compatibility, as shown in FIG. 4. The DSC values of FIG. 4 were obtained using a Du Pont 990 Thermal Analyzer (trademark). The upper curves ("endo") in FIG. 4 are DSC solidification curves and show nearly identical profiles during cooling. $\Delta H_f$ is enthalpy change. Specifically, the peak minimum heat of fusion point occurs at substantially the same temperature (13°–14° C.). The lower curves ("exo") in FIG. 4 are DSC melting curves and also show nearly identical profiles during heating. Specifically, the peak maximum melting point occurs at substantially the same temperature (35°–36° C.)

A method for determining cocoa butter compatibility is to subject the cocoa butter equivalent of the present invention to a cooling curve test suitable for judging the quality of cocoa butter. In this method, cocoa butter (or any fat) is allowed to cool in a constant temperature environment (17° C.) with carefully controlled stirring. The temperature is recorded each minute. Once crystallization begins, the temperature of the sample will rise due to the latent heat of crystallization, and will stop when crystallization reaches a maximum.

Figure 5:
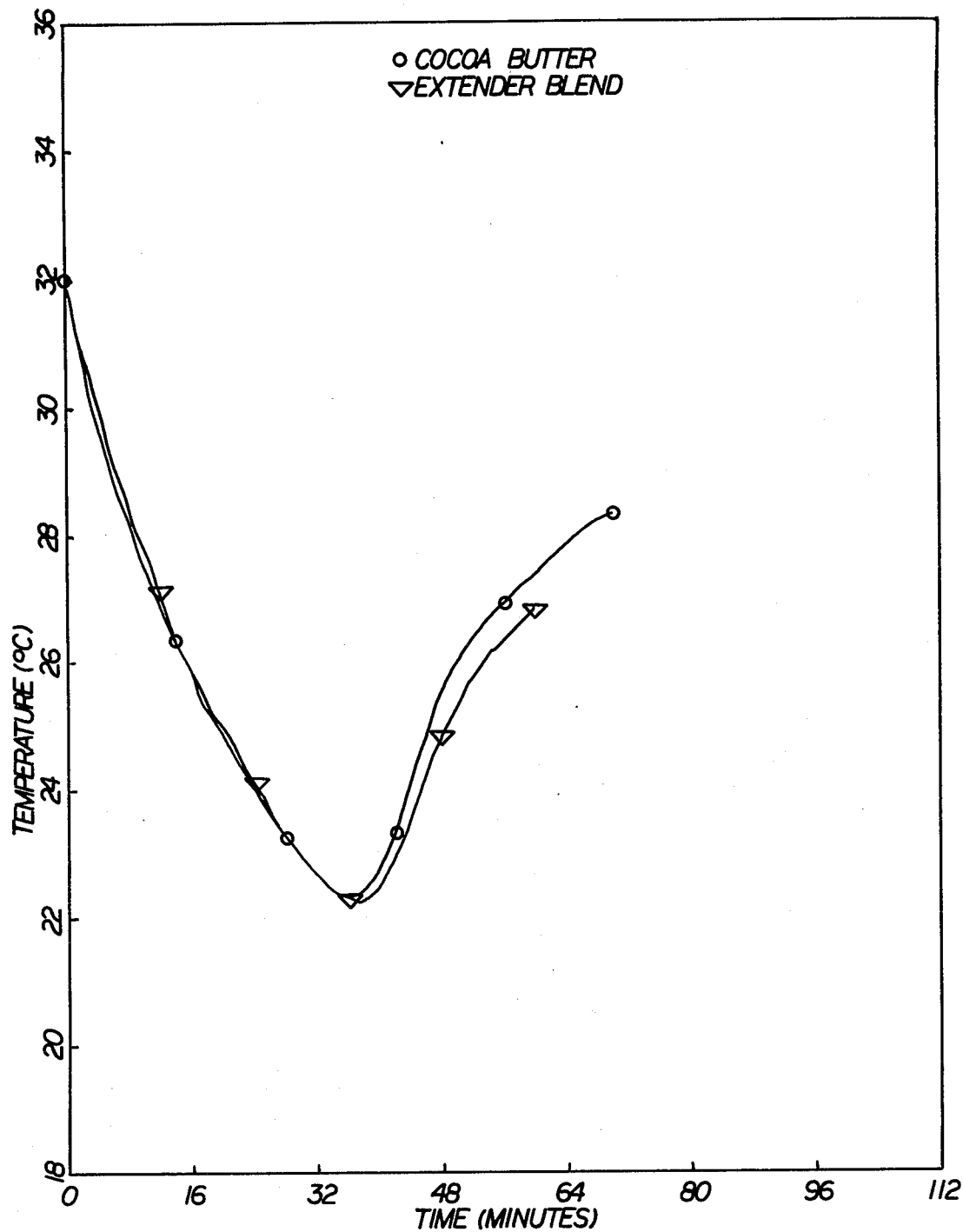
FIG. 5 contains cooling curves of cocoa butter and a blend containing cocoa butter plus 15% of the cocoa butter equivalent of the present invention.

From the recorded data, a time vs temperature Cooling Curve can be graphed. Cocoa butter has a very specific Cooling Curve profile as is shown in FIG. 5. Here, cocoa butter is plotted with an extender blend of 85% cocoa butter and 15% of an experimental cocoa butter equivalent prepared following the procedure of Example 5. It can be seen that the cocoa butter equivalent does not significantly alter the profile of the Cooling Curve of cocoa butter at the extender level. The two curves are substantially identical. The compatibility of the claimed cocoa butter equivalent composition of Example 5 with cocoa butter, at the 15% addition level, is therefore shown by the cooling curve.

The cocoa butter equivalent of the present invention may be used at even higher levels of addition to cocoa butter.

Other blends of palm mid-fraction prepared according to the procedure of Example 4 and sal stearin prepared according to the procedure of Example 3, may be used as a cocoa butter equivalent. Specifically, a blend of about 70:30 may successfully be used, as shown in the following example.

TABLE VII
Composition: 70% palm mid-fraction, 30% sal stearin
Mettler Dropping Point (1° C./min. cooling rate) after tempering - 35.8° C.

| Fatty Acid Carbon No. | % in whole sample |
|---|---|
| 14:0 myristic | 0.5 |
| 16:0 palmitic | 41.8 |
| 18:0 stearic | 18.8 |
| 18:1 oleic | 33.2 |
| 18:2 linoleic | 2.7 |
| 20:0 arachidic | 2.5 |
| IV | 33.7 |

Triglyceride structure data as determined by HPLC/GC analysis

| Triglyceride | % Triglyceride |
|---|---|
| POP | 43 |
| POS | 14 |
| SOS | 17 |
| Total symmetrical triglycerides via argentation TLC | 78% |

The cocoa butter equivalent, following the procedure of this Example, was blended with cocoa butter at a 15% extender level and the blend was subjected to the same DSC and Cooling Curve tests of Example 5. These tests showed nearly identical profiles for the cocoa butter equivalent extender blend with cocoa butter and cocoa butter alone, demonstrating compatibility with cocoa butter.

In this specification, all parts and percentages are weight parts and percentages except as otherwise expressly indicated, and except when listing an exemplary percentage of fatty acid equivalents present in a triglyceride sample (which closely approximates the true weight percentage), and when listing the percentage of a particular fatty acid moiety thereafter as being in the 2-position; the latter listing is the percentage of that particular moiety joined to a glycerine residue at the 2-position.

What is claimed is:

1. A cocoa butter equivalent hard butter comprising a blend of
   (a) a fractionated crude or refined sal fat having an IV of about 29–36 and a Mettler Dropping Point of about 36°–39° C. and consisting essentially of triglycerides of fatty acids in the following approximate proportions:

| Fatty Acid | Approximate Percentages |
|---|---|
| Palmitic | 5–8 |
| Stearic | 45–52 |
| Oleic | 30–40 |
| Linoleic | less than 1.5 |
| Arachidic | 4–10 | with at least about 89% of the oleic acid being in the 2-position of the triglycerides; and (b) a mid-fraction of palm oil having an IV of about 30-44 and a Mettler Dropping Point of about 33°-38° C. and consisting essentially of triglycerides of fatty acids in the following approximate proportions:

| Fatty Acid | Approximate Percentages |
|---|---|
| Palmitic | 51-58 |
| Stearic | 5-8 |
| Oleic | 30-36 | with at least about 71% of the oleic acid being in the 2-position of the triglycerides, said proportion of sal fat fraction to palm oil mid-fraction being about 60:40 to 25:75.

2. A cocoa butter equivalent hard butter having an approximate fatty acid composition consisting essentially of

| Fatty Acid | Approximate Percentages |
|---|---|
| Palmitic | 31-43 |
| Stearic | 18-30 |
| Oleic | 33-35 | with at least about 80% of the oleic acid being in the 2-position of the triglycerides, said hard butter having an IV of about 33-35 and a triglyceride composition as determined by High Performance Liquid Chromatography and Gas Chromatography of about:

| POP | 27-44% |
| POS | 11-15% |
| SOS | 14-28% | where P equals palmitic acid, S equals stearic acid, and O equals oleic acid, the total symmetrical triglycerides as determined by argentation thin-layer chromatography being at least about 65%.

3. The hard butter of claim 2 wherein said total symmetrical triglycerides is at least about 75%.

4. A confectionery coating containing the hard butter of any of claims 1, 2 or 3.

5. A method for the preparation of the cocoa butter equivalent hard butter of claim 1 including the steps of (a) fractionating crude or refined sal fat by removal of a filtrate portion representing about 25-30% of the starting material to obtain the sal fat fraction identified in claim 1;

(b) fractionating a refined palm oil starting material by removing a liquid first fraction from a solid fraction in a first fractionating step, representing about 65-70% of said starting material, and then by removing from the resulting solid fraction a second solid fraction in a second fractionating step to obtain the palm mid-fraction representing about 22-27% of said starting palm oil material; and (c) blending said sal fat fraction and said palm mid-fraction.

* * * * *